United States Patent [19]

Musil

[11] Patent Number: 5,193,935
[45] Date of Patent: Mar. 16, 1993

[54] SOIL DECONTAMINATION APPARATUS AND METHODS OF DECONTAMINATING SOIL

[75] Inventor: Joseph E. Musil, Ely, Iowa
[73] Assignee: Cedarapids, Inc., Cedar Rapids, Iowa
[21] Appl. No.: 908,903
[22] Filed: Jul. 2, 1992

Related U.S. Application Data

[63] Continuation of Ser. No. 638,046, Jan. 7, 1991, abandoned.

[51] Int. Cl.[5] ............................................. B09B 3/00
[52] U.S. Cl. ................................. 405/128; 405/131; 405/258
[58] Field of Search .............. 405/128, 129, 131, 258, 405/263; 110/346; 134/40; 210/170, 747; 432/105

[56] References Cited

U.S. PATENT DOCUMENTS

| Re. 29,469 | 12/1977 | Dydzyk . | |
|---|---|---|---|
| 1,205,948 | 11/1916 | Popkess | 404/91 |
| 2,626,875 | 1/1953 | McConnaughay | 427/220 |
| 3,820,914 | 6/1974 | Zimmerman | 404/110 |
| 4,011,023 | 3/1977 | Cutler | 404/91 |
| 4,226,552 | 10/1980 | Moench | 404/92 |
| 4,272,212 | 6/1981 | Bauer, Jr. et al. | 404/72 |
| 4,395,125 | 7/1983 | Musil . | |
| 4,529,497 | 7/1985 | Watson et al. | 405/128 X |
| 4,619,550 | 10/1986 | Jeppson | 404/80 |
| 4,705,404 | 11/1987 | Bruggemann . | |
| 4,787,938 | 11/1988 | Hawkins . | |
| 4,834,194 | 5/1989 | Manchak | 405/131 X |
| 4,839,061 | 6/1989 | Manchak et al. | 405/129 X |
| 4,919,570 | 4/1990 | Payne | 405/128 |
| 4,993,873 | 2/1991 | Tippmer | 405/128 |
| 5,039,415 | 8/1991 | Smith | 405/128 X |
| 5,088,856 | 2/1992 | Yocum | 405/128 |

OTHER PUBLICATIONS

"Tech Trade—Mixing to the heat of a different drum", Texas State Dept. of Highways & Public Transportation, Jan. 1988.
"Counter flow design stirs interest", asphalt contractor, May/Jun. 1988.

Primary Examiner—David H. Corbin
Attorney, Agent, or Firm—Simmons, Perrine, Albright & Ellwood

[57] ABSTRACT

A soil decontamination apparatus is based on a heating operation performed on soil to be contaminated to vaporize and burn off hydrocarbons. The soil is fed into a drum drier at a constant rate which is related to the moisture contents in the soil and the energy available from the burner of the drum drier. Soil particles in the form of dust which become entrained in the hot gases which are used in the decontamination process are removed from the gas stream and are recombined with the base material of the soil in a region of the drum drier which is substantially devoid of gas flow. The substantially calm atmosphere in the region of the drum drier in which the recombination takes place permits the fines to be mixed with the base material without the fines again being carried off by gaseous movement. A soil reconditioning is provided for in an isolated third zone of the drum drier.

15 Claims, 4 Drawing Sheets

SOIL DECONTAMINATION APPARATUS AND METHODS OF DECONTAMINATING SOIL

This application is a continuation of application Ser. No. 638,046 filed Jan. 7, 1991, now abandoned.

BACKGROUND OF THE INVENTION

1. Field of the Invention

This invention relates generally to soil decontamination and particularly to apparatus for and methods of removing hydrocarbon and other contaminants from contaminated soil. The decontaminated soil may then be returned to the ground from which it was removed without being a potential environmental hazard.

2. Discussion of the Prior Art

Current efforts in the environmental areas have brought fourth efforts to alleviate and clean up hazardous soil conditions that are likely to present health hazards by leaking potentially cancer causing hydrocarbons into water supplies. Hazardous conditions are caused, for example, by leaks from outdated underground storage tanks of long established gas stations. The remedial work which is typically undertaken is the removal of contaminated soil and replacement of old and rusty gasoline tanks with new tanks. The removal and storage of the contaminated soil in another location does, unfortunately, not alleviate the problem of the existence of the contaminated soil. Efforts have therefore recently been made in providing apparatus for separating hydrocarbons from the soil.

DISCUSSION OF THE INVENTION

The invention pertains particularly to improve current material handling apparatus to cope with problems associated with the removal of hydrocarbons. Soil excavations produce various gradations and types of soil. The excavated soil may be powdery and dry and include only portions of caked and contaminated soil. Or the soil may be largely moist and water laden, including in only certain volumes thereof significant amounts of hazardous contaminants. Other soil may be rocky and again may include contaminated pockets of polluted fines, the pollution including caked fines. Decontamination apparatus, consequently, needs to efficiently handle soil of various constitutions.

The invention consequently provides for a feeder system which readily permits the feed rate and route of materials to be altered to precondition the materials to be fed to the decontamination apparatus. The feeder system includes a screening operation which separates materials above a preselected size, for example one inch diameter, from the remaining bulk materials. It is intended to break up soil conclomerations which may contain large amounts of contaminants. The screened bulk of materials is routed to a feed hopper. Oversize materials are subjected to a comminution operation, such as by a horizontal shaft impeller crusher. The crushed materials may then be fed directly into the decontamination apparatus by a main feed conveyor. In the alternative, the crushed materials may be returned to the screening operation to continue the route of over-sized materials until comminuted to pass through the screen mesh of preselected size.

According to the invention it is preferred to feed materials into the decontamination apparatus at a controlled rate. When crushed materials are routed from the comminution apparatus directly to the main feed conveyor, it is contemplated to feed materials from the feed hopper to the feed conveyor at a controlled rate to supplement the materials passing through the comminution apparatus. As a result, materials may be fed from the feed hopper to the main feed conveyor either intermittently or at a variable rate to supply the decontamination apparatus with materials at a substantially constant rate. The supply rate may be adjusted to compensate for amounts of contaminants or moisture contents in the materials to be contaminated.

According to a preferred embodiment of the invention materials may be discharged from the feed hopper to the main feed conveyor at a controlled rate by a secondary feed conveyor. Both the main feed conveyor and the secondary feed conveyor may be slat conveyors. A leading edge of the hopper includes a plurality of material dispersing spiked, rotating shafts to break up soil jams which might otherwise clog the hopper discharge end when the materials are moisture laden and cohesive. The main feed conveyor preferably includes a weigh cell which determines the feed rate of material into the decontamination apparatus. When the weigh cell senses a change in the feed rate away from a preferred feed rate of materials on the conveyor, the feed of materials from the feed hopper is adjusted accordingly to normalize the amount of material on the main feed conveyor. Any speed change of the secondary conveyor may be in small, incremental steps or it may be as severe as a stop and go operation. In such latter type of operation a gate is incrementally adjusted to even the material flow rate on the main feed conveyor.

The decontamination apparatus according to the preferred mode separates the hydrocarbons from the soil in a heat treatment rather than by a water treatment. In passing the soil through a stream of hot gases, the hydrocarbons become vaporized and are thereby removed from the soil. Fine dust particles which constitute a major portion of the contaminated soil have, however, also a tendency to become airborne and remain in a hot air stream carrying off the hydrocarbon vapors. The dust, also referred to as fines, needs to be removed from the air stream in a filter operation. A cyclone filter may used to precede a baghouse filter and alleviate the throughput of materials through the baghouse filter. The air stream may be cleaned by combustion in an after-burner. Such operation oxidizes hydrocarbon vapors into carbon dioxide and water vapor.

Decontamination of dust or fines may be aided in a particular, improved operation beyond an initial decontamination of the fines by the hot air stream. The hot air stream has been found to vaporize substantially the hydrocarbons carried by the dust particles in the fines. However, after separation of the fines from soil particles larger than the fines by the hot gases, the course soil remains in contact with the decontamination gases. The fines may now be recombined with the course soil, also referred to as base material, while the base material is still in a superheated state after completion of the decontamination operation. In an area of the apparatus removed from gas flow, and while the base materials are still at substantially their peak temperature, the fines are brought into contact with the base materials and are mixed therewith. The mixing results in heat transfer from the base material to the fines. The result is beneficial in that it is desired to ultimately cool the decontaminated soil to normal or ambient temperatures. Further the heated base materials reheat the fines to a temperature above the vapor point of any hydrocarbons that may still reside in the fines.

The latter process overcomes a possible source of incomplete decontamination of wet soil, hence contaminated soil which also carries originally a substantial amount of water. In such a case the initial contact of the soil with the hot gases brings about a drying action and the fines may be carried off by already cooled gases and resulting steam. In extreme cases of moisture contents in the soil, the gases may cool to a range in which vaporization of hydrocarbons is less than complete. Temperature probes may be provided to monitor product and gas temperatures and burner outputs can be increases accordingly. However, heat energy may only provided up to the limit of the burner capacity. When extremely wet soil conditions prevail, a solution is to slow the feed rate of the materials to be decontaminated.

A particular aspect of the invention addresses a mobile decontamination system combining various discussed advantage of the invention with the added advantage of mobility. Such a mobile decontamination system may combine the soil feeder system and the decontamination apparatus on a common mobile frame to increase the mobility of the apparatus with resultant economic advantages. The mobile system is advantageous in allowing the decontamination process to be relatively quickly set up at sites where contaminated soil has been located. Such site may be remotely located from an established stationary decontamination system as disclosed herein.

A stationary system with respect to which the various features are described herein does not have the size restrictions that a mobile decontamination system is subjected to. A mobile system disclosed herein may be provided with a saddle-shaped baghouse filter system which straddles a drier drum of the decontamination apparatus. Longitudinally extending auger conveyors on both sides of the drum may carry the fines from the baghouse filter to the discharge chute of drier drum to combine the decontaminated fines with the decontaminated base material at the discharge end of the drier drum. Alternatively the fines may be combined with the base material in a zone of the drum which is removed from the flow of gases.

In view of the above considerations of various aspects of the invention, it is therefore an object of the invention to provide an apparatus for decontaminating soil at an optimum rate with a decontamination apparatus having a controlled feed rate.

Another object of the invention is to decontaminate soil in a hot air stream and to recombine fines separated by the hot air stream from the base material with the base material in an operation removed from the hot air stream and while the base material is still in a superheated state above the vaporization temperature of the contaminants.

Still another object of the invention is to adapt the feeding of materials into a soil decontamination operation to the condition of the starting material and to vary the feed rate of material into the decontamination apparatus to provide for an increase of available energy per volume of contaminated soil when a correspondingly increased drying action becomes necessary before the materials are heated to a preferred decontamination temperature.

Another object of the invention is to provide an integrated contaminant separation and capture apparatus which is compact and which may be transported without substantial dismantling operations.

A further object of the invention is to reconstitute the decontaminated soil in a pre-discharge zone of the decontamination apparatus.

Various advantages and features of the invention in accordance herewith will become apparent from the further description of the invention and from the description of the described preferred embodiments thereof which may be read in reference to the appended drawings.

SUMMARY OF THE INVENTION

In accordance with the invention, apparatus for decontaminating soil includes a compound feeder system for feeding material into a soil decontamination apparatus. The feeder system includes a feed conveyor for feeding the material into the soil decontamination apparatus. The feed conveyor includes first and second provisions for loading materials onto the feed conveyor. A provision for determining the feed rate from the first feed conveyor loading provision is used to control the feed rate of the second feed conveyor loading provision.

According to a more particular aspect of the invention, a mobile soil decontamination system is mounted to a mobile frame and includes a feeder system and a decontamination apparatus fed by the feeder system. A filter system may be mounted to straddle a drier drum of the decontamination apparatus.

BRIEF DESCRIPTION OF THE DRAWINGS

The Detailed Description below will be best understood when read in reference to the accompanying drawings wherein.

DETAILED DESCRIPTION OF THE INVENTION

Figure 1:
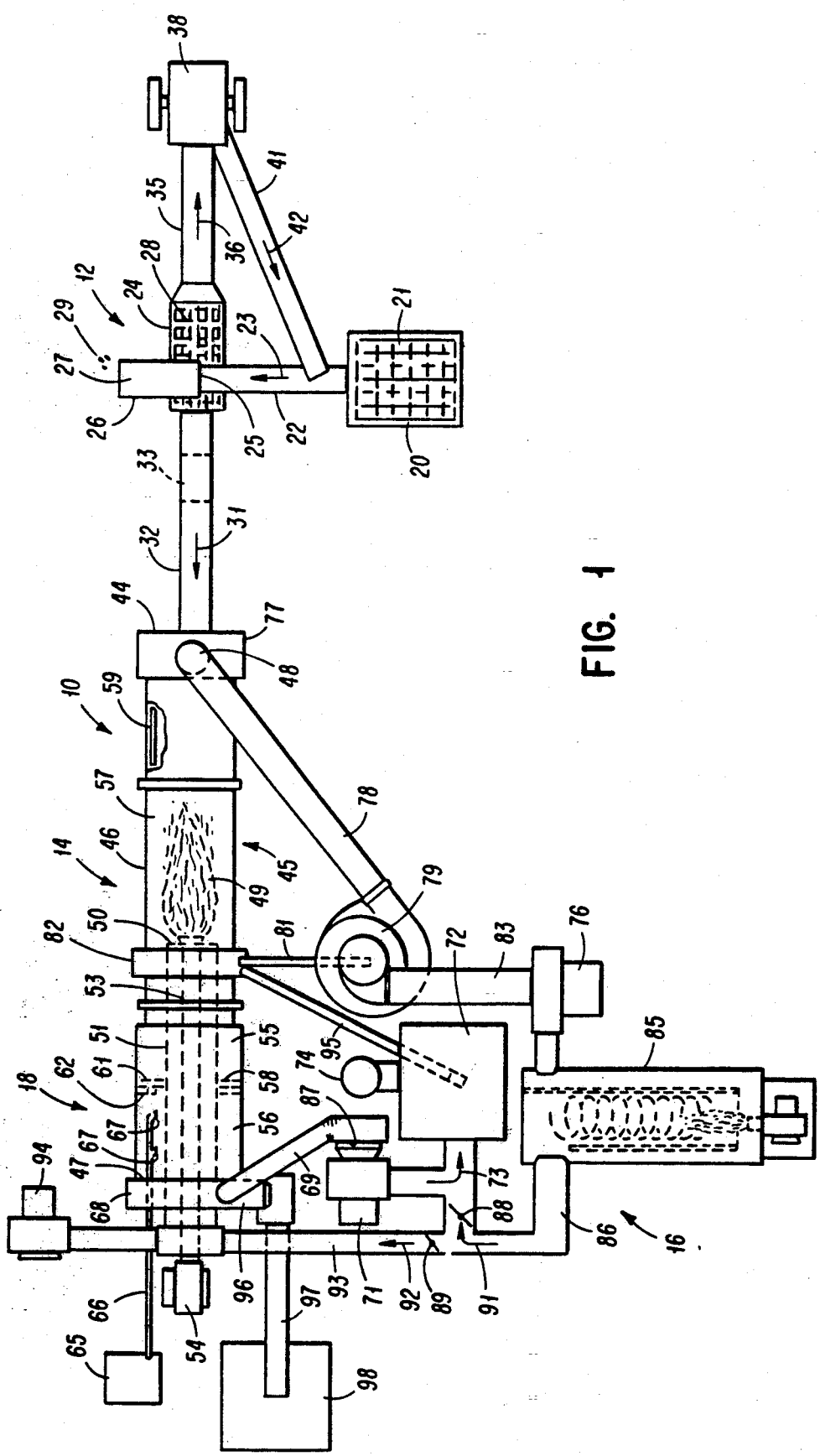
FIG. 1 is a simplified schematic plan view of a soil decontamination apparatus which illustrates various features of the present invention.

FIG. 1 shows a stationary soil decontamination system designated generally by the numeral 10. In the order of material flow through the soil decontamination system 10, the system includes subsystems of apparatus which may be categorized broadly as a feed system 12, decontamination apparatus 14, air remediation apparatus 16, and soil reconditioning apparatus 18.

The feed system 12 includes a first material feed hopper 20 into which contaminated soil is first loaded. The feed hopper 20 is the charging point of the soil decontamination system 10. Typically, the feed hopper 20 includes an upper grating or "grizzly" 21 which keeps out oversized rocks and other foreign material that is not within the material handling capabilities of the soil decontamination system 10. A feed conveyor 22 transports the material from the hopper 20 in the direction of arrow 23 toward a screening plant 24. Just before being discharged from an upper end 25 of the feed conveyor 22, the material on the conveyor 22 moves into an active range of a ferrous material separation apparatus 26. In accordance with the typical operation of such a ferrous material separator, an overhead, inverted conveyor band 27 shown on upper return path moves past a magnet which is disposed above the upper end of the feed conveyor 22. Magnetically attracted materials become attracted to the magnet and stick to the underside of the adjacent conveyor band 27 which moves in the same direction as the conveyor 22. Thus, the soil and non-magnetic materials are discharged at the end 25 of the conveyor 22 onto a screen 28 of the screening plant 24, while magnetically attracted materials continue to move on the underside of the ferrous material separator to be discharged therefrom at a discharge point 29 adjacent the screening plant 24. It should be noted, however, that the presence or absence of the ferrous material separator is not essential to the broad scope of the invention, rather is one of specific advantage, in that metals may be considered environmental hazards in themselves and the removal of ferrous elements in the course of soil decontamination may be an additional element, though not a necessary element of soil decontamination. Only to a miniscule degree may the presence of rusted ferrous elements affect the inadvertent retention of contaminating hydrocarbons which are expected to be removed in accordance with the present invention.

The screen 28 of the screening plant 24 is selected to pass the maximum soil particle size of material which can be heated in the course of being processed within the decontamination apparatus 14 to above the vaporization point of hydrocarbons suspected of contaminating such soil particles. Typically, a screen grid between one and two inches may be chosen. The screening plant 24 is contemplated to be a typical vibratory screening apparatus. The soil which passes through the chosen grid size of the screen 28 advances in the direction of arrow 31 on a m in feed conveyor 32 toward the decontamination apparatus 14. A weigh cell, or weigh bridge 33, disposed in a section of the main feed conveyor 32 measures in a known manner the weight of material on the respective section of the conveyor at any one time. Thus, when coupled to the linear speed of the feed conveyor 32, the weigh bridge 33 determines the feed rate of material into the decontamination apparatus 14. The feed rate of material is a criterion for controlling the operation of the soil decontamination system 10.

Soil constituents which do not pass through the grids of the screen 28 are routed onto a crusher conveyor 35 and proceed in the direction of arrow 36 toward a comminution apparatus 38, which may be, for example a horizontal shaft impeller impact crusher, also hammermill 38. Such type of crusher is preferred in that it preferentially breaks up larger lumps of soil which may have existed because of caking of smaller soil particles, such as by the presence of moisture or contaminating hydrocarbon oils. From the crusher 38 the materials are routed via a crusher discharge conveyor 41 in the direction of arrow 42 toward the first feed conveyor 22 to be redirected for another path through the screening plant 24. It should be realized that materials may be subjected to the described crushing operation more than one time, in that as long as the materials do not fall through the grids of the screen 28, the materials will again be routed through the crusher 38.

Though the conveyor 41 is shown as discharging the materials from the crusher 38 onto the conveyor 22, it may be deemed desirable to return the comminuted materials to the first feed hopper 20. The hopper 20 serves as a material storage provision to distribute incremental charges, such as from trucks or loader buckets to a continuous feed rate. It should be realized, however, that the material fed into the first feeder hopper is itself not uniformly homogenious. The constitution of the material may vary between consecutive incremental charges. Thus, one charge may be of materials which primarily become routed toward the crusher, while a subsequent charge of the first feed hopper may consist primarily of materials that pass through the grids of the screen 28. It will be realized that the materials may then combine on the feed conveyor 22 to result in a non-uniform discharge from the screening plant 24. The screening plant 24 may, consequently, further include a second feed hopper and feed provisions for controlling the amounts of material discharged from the screening plant 24 in response to the feed rate obtained from the weigh bridge 33, as may be better understood in reference to and from the description of the apparatus shown in FIGS. 2 or 4, for example. As a crude alternative, the conveyor 41 may be directed to discharge into the first feed hopper 20 and the feed conveyor may be controlled to increase or decrease its feed rate as a result of feed rate readings obtained from the weigh bridge 33.

The main feed conveyor 32 discharges the soil material into a feed end 44 of what may generally be referred to as a drum drier 45. In the preferred embodiment described herein the drum drier 45 is of the type commonly referred to as a counterflow type apparatus. The apparatus 45 includes various features beneficial to the practice of the invention as described herein. As is typical for drum driers, the apparatus includes a drum 46 which is mounted for rotation about a longitudinal axis and includes internal flighting to lift and advance the material in a direction from the feed end 44, also referred to as intake end, to a discharge end 47 at the end opposite to the intake end 44 of the drum 46.

The designation of counterflow apparatus results from the direction in which hot gases flow within the drum 46. In a counterflow apparatus, hot gases flow against the general direction in which the material flows through the drum, such that the material intake end 44 of the drum also includes an exit port 48 of hot gases which dry and decontaminate the soil introduced into the drum 46 at the intake end 44. Material moves through the drum 46 in a well known manner driven by the axial rotation of the drum and by flighting attached to the inner wall of the drum 46. The flighting raises the material and drops it in a veil substantially at right angles to the flow of the hot gases. In the flame region modifications of the flighting prevent material from falling directly through the flame. The flighting and movement of the material through the drum 46 are substantially similar to that in known counterflow drums and proceeds similar to their operation.

To fully understand the decontamination operation is should be realized that the smallest constituents are substantially the first to dry and to rise to a temperature above the vaporization temperature of the hydrocarbons to be vaporized and thereby removed from the soil. As the soil remains in prolonged contact with hot gases, increasingly larger soil particles dry and are heated to the desired vaporization temperature of the hydrocarbons. This latter process becomes accelerated as the material travels against the flow of the hot gases toward and into a flame region 49 of the drum drier 45. The fines, the smallest particles of the soil, after having been dried and decontaminated, are found to become entrained in the stream of hot gases and are drawn off through the exit port 48 together with the exhausted hot gases. The removal of the fines which already have been decontaminated increases the contact and exposure of the remaining soil particles with the hot gases to further the decontamination process.

FIG. 1 shows a preferred embodiment of a counterflow apparatus in which a burner head 50 is displaced from a typical location at the discharge end 47 of the drum 46 to a position toward a more central location between the intake end 44 and the discharge end 47 of the drum drier 45. It should be realized that because of such displacement gas flow as initiated by the burner head 50 exist only between the burner head 50 and the exit or exhaust port 48 of the drum drier 45. Gas flow necessary to sustain the combustion process is also prevented from freely flowing within the drum in the region between the discharge end 47 and the burner head 50 by a secondary air tube 51 which extends as support structure from the discharge end 47 concentrically with the drum 46 into the drum. The secondary air tube 51 terminates at the intermediate position along the axis of the drum 46 at which the burner head 50 is disposed. Fuel lines and a primary air duct 53 are disposed and supported within the secondary air tube 51. Thus, both primary air flow supplied by a primary air blower 54 under pressure to the burner head 50 and any required amount of secondary air flow supplied through the secondary air tube remain are confined to within its conduits in the secondary air tube 51. Consequently, in the absence of other gas movement, an annular region between the secondary air tube 51 and the drum 46 becomes a region of gaseous stagnation. Thus, while the annular region is considered to have substantially no gaseous movement, the term stagnation does not take into consideration minor movement of gases or air within the region as a result of the rotation of the drum 46 during the operation of the drum drier, or as result of movement of material such as the soil within such annular region. It is understood that this action has an effect of the gases within the region. However, in relation to the stream of gases within the heating and drying region of the drum, such is substantially no movement of gases or atmosphere within the annular region.

The annular region of gaseous stagnation may, according to a particular aspect of the invention, be further divided into a first or soil combination zone or region 55 and a soil reconstitution zone or region 56. The soil combination zone 55 is disposed adjacent the burner head 50 and adjoins the flame region 49 of a heating and decontamination zone 57 of the drum drier 45. In the soil combination zone 55 the fines are recombined with the base material that has just moved through the flame region 49 and is at that time at its peak temperature. Since there is essentially no gas flow in the annular soil combination zone, the fines previously removed by the hot gas stream can be recombined with the bulk or base material of the soil without the fines or dust being carried off again by the air flow. At the same time, the recombined dust which may have cooled following the removal from the drum drier 45 experiences a heat transfer from the heated base material. This reheats the dust or fines to above the vaporization temperature of the hydrocarbons. Thus, if there are still hydrocarbons attached to the dust particles which have not yet been vaporized, the hydrocarbons will now vaporize. As an added advantage the peak temperature of the base material begins to cool. In advancing toward the discharge end 47 of the drum drier 45, the fines and the base material are intermixed with each other.

The second or soil reconstitution zone 56 may be included as an integral element of the decontamination apparatus 14. The inclusion of the second zone 56 in the annular region between the soil combination zone 55 and the discharge end 47 of the drum drier 45 necessitates the inclusion of a material passage gate 58 which restricts gaseous movement in a direction opposite to the general flow of the soil through the drum drier 45. Typically the material is advanced through the drum drier 45 by well known flighting 59 extending the length of the drum 46. Though the flighting is modified so as not to interfere with the flame, the flighting generally advances the material by lifting and dropping the material, or by urging it, somewhat supported by an angle of incline of the drum 46 in the direction of movement. Generally, however, the flighting supports free material movement within the drum. The construction of the gate 58 differs from that of the typical flighting. The gate may be constructed by scoop type material advancing vanes 61 mounted in an annular region directly adjacent the inner wall of the drum 46, and an annular baffle plate 62 which is stationary and may be mounted to the secondary air tube 51, for example. The baffle plate 62 would substantially seal off substantially the entire annular space between the secondary air tube 51 and the inner surface of the drum 46 except for a lowermost open sector thereof, through which the vanes 61 would advance the soil from the soil combination zone 55 to the soil reconstitution zone 56. However, the soil material passing through the open sector constitutes in itself a blockage to gaseous flow through the open sector.

A liquid supply 65 provides a liquid such as water or other approved and non-contaminating emulsions for introduction into the soil reconstitution zone 56. A conduit 66 for introduction of such liquid communicates between the supply 65 and the zone 56. One or more axially spaced openings 67 in the conduit 66 introduce the liquid into the annular space of the zone 56 and direct the liquid into contact with the soil before it is discharged from the drum. Contact of the liquid with the hot and dry soil generates excessive amounts of steam. Steam generation in turn cools the soil toward temperatures at which water will no longer vaporize, such that ultimately a certain amount of moisture may be retained in the soil before it is discharged from the drum.

Excess steam generated within the soil reconstitution zone 56 is drawn from the drum 46 at a discharge collar 68 through a steam duct 69 by a turbo blower 71 and routed to a final filter house 72 as indicated by arrow 73. From the final filter house, which may be a typical baghouse filter, the steam together with other exhaust and cooling gases as will become apparent may be discharged to the atmosphere through an exhaust stack 74. The final filter 72 is the main gas filter of the decontamination system 10, the exhaust of which is expected to be within allowable limits when being exhausted through the stack 74. Dust laden and hydrocarbon rich hot gases exiting from the exhaust port 48 of the drum drier 45 are consequently drawn by an intake of a turbo blower 76 from an exhaust box 77 through an exhaust conduit 78 into a cyclone separator 79, for example. The cyclone dust separator 79 may be used to provide a first stage of dust reduction. Fine soil particles collected in the separator 79 are returned to the soil combination zone 55 via a conduit 81 and a material feed collar 82 similar to known feed collars for feeding recycle materials at intermediate axial drum positions into aggregate drying drums, for example. The gases with at least some of the fines removed by the separator 79 advance through conduit 83 toward the turbo blower 76 and are forced into an afterburner 85. The afterburner 85 burns the hydrocarbon gases to reduce them to environmentally acceptable carbon dioxide and water vapor. However, the gases exiting the afterburner 85 through an exit duct 86 are too hot to be routed without cooling to the baghouse filter 72. The turbo blower 71 has, consequently, a further function of providing through an intake port 87 outside air to mix with the exhausted gases from the afterburner 85 before they are introduced into the filter 72.

Baffles 88 and 89 are adjustable. Thus, a portion of the gases discharged from the afterburner 85 may be routed in the direction of arrow 91 to mix with cooling air and steam from the turbo blower 71 and be routed through the filter 72 to the stack 74. However, another portion of the hot exhaust from the afterburner may on momentary demand be routed in the direction of arrow 92 through duct 93 to be returned to the secondary air supply of the burner 50. It is to be realized, however, that such routing is a pressure equalization routing and for other short term demands, in that ultimately all gases introduced into the decontamination system 10 are discharged through the stack 74 after passing through the final filter 72. Typically, secondary air may be supplied under pressure by turbo blower 94.

Dust collected in the final filter 72 is routed via a return conduit 95 to the material feed collar 82 and is introduced into the soil combination zone 55 to be recombined with the base material of the decontaminated soil as described above. The recombined decontaminated soil which may also have been reconstituted as described herein is subsequently discharged at the discharge end 47 into a discharge chute 96 and carried by a convenient transport system, such as a discharge conveyor 97 to a convenient storage or transfer bin 98. From there the decontaminated soil may be loaded onto transport vehicles and be transferred to ground fill sites as required.

Figure 2:
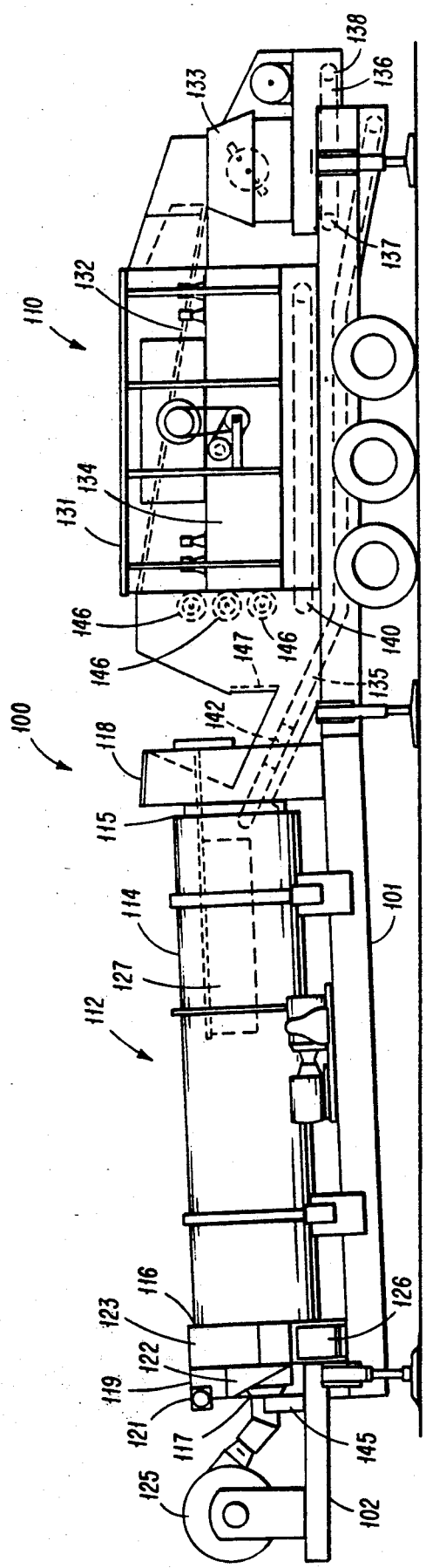
FIG. 2 is a side elevation of a portable soil decontamination apparatus in accordance with the present invention.

FIG. 2 is a side elevation of a preferred portable soil decontamination apparatus which is designated generally by the numeral 100. The soil decontamination apparatus 100 is shown as being mounted on a truck frame 101 including a front saddle 102, allowing the frame to be hitched to a truck tractor and hence be pulled as a semi-trailer between job sites. The frame 101 is shown as being supported by jacks 103 steadying the apparatus 100 for operation. The apparatus 100 comprises a soil feed system 110 and a decontamination drum drier 112.

It should be understood that a number of changes and variations or substitutions are possible in the selection and physical characteristics of the drum drier 112 without departing from the spirit and scope of the present invention. It is, for example, possible to mount the drum drier 45 as described with respect to FIG. 1 as a portable or mobile drum drier on a frame such as the frame 101 in substitution of the drum drier 112. Often, drum driers are mounted on frames for convenience, even if later use is expected to be from a fixed location, such as a larger aggregate production facility. The drum drier 112 is in essence considered to be the equivalent of the drum drier 45 described with respect to FIG. 1. Changes and modifications within the scope and spirit of the invention are further described. It should be noted that the frame 101 has a bend which positions the drum drier 112 at an incline with respect to the feed system 110. This is an advantage in the contemplated operation of the apparatus 100, in that time savings may be derived in setting the apparatus up for operation at a new location, in that the incline of the drum drier corresponds to a normal operational angle of a drum 114 in which gravity is used to aid the flow of material from an intake end 115 to a discharge end 116 of the drum 114. As the drum drier 45, the drum drier 112 is a preferred counterflow apparatus, such that a burner unit 117 extends from the discharge end 116 into the drum 114, and hot exhaust gases exit through an exhaust box 118 disposed at the material intake end 115 of the drum 114. For the apparatus 100 to become operational, the exhaust box 118 needs to become coupled to exhaust treatment apparatus substantially similar to the apparatus described in detail with respect to FIG. 1 and including a final filter similar to the baghouse filter 72 shown in FIG. 1. Collected fines and dust from the filter are returned from the filter to be recombined with the remaining base material having passed through the drum drier 112 to become decontaminated of hydrocarbons. It should be understood that this may be accomplished via an intermediate material feed port, such as the feed port 82 described with respect to the drum drier 45. A significant criterion, however, is that the fines be returned to a stagnant zone of the the drier, as previously described. FIG. 2 shows an alternative dust return structure 119 for previously separated fines. The fines may be returned to the structure 119 either by pneumatic transport ducting or by alternative screw conveyors. Both of these equivalents are indicated by a duct termination 121. From the duct termination 121 the fines are advanced by gravity through a chute 122 into a discharge box 123 of the drum drier 112. The discharge box 123 is disposed in all instances out of the stream of gases generated within the drum 114 by the burner 117 or any turbo blower associated therewith, such as the turbo blower 125 mounted on the saddle 102. As is typical for drums of drum driers, the drum 114 is equipped with discharge paddles at the discharge end 116 which urge the material from the discharge end of the drum 114 into the discharge box 123. The agitation of the paddles (not shown) may be used to mix the fines with the discharging base material, while both the fines and the base material are being urged by the paddles to a discharge chute 126 at a lower end of the discharge box.

Exhaust temperature of the hot gases being exhausted from the drum drier is of concern. When the material being fed into the drum contains considerable amounts of moisture, the temperature of exhaust gases may drop to a point at which water vapor condenses in the baghouse filter, caking the dust and fines on filter elements and thereby necessitating a temporary shutdown of the apparatus. FIG. 2 shows a veil modification apparatus comprising adjustable plates 127 by which the exposure of material to the hot gases can be altered, such that the temperature of the exhaust gases may be instantaneously raised by an adjustment above the condensation temperature of water to avoid a filter clogging condition. The structure and operation of the veil modification apparatus is disclosed in detail in a copending patent application by Don R. Linkletter and Joseph E. Musil, Ser. No. 529,136, filed on May 25, 1990, now U.S. Pat. No. 5,067,254 which is assigned to the assignee of the present application.

The soil feed system 110 includes features of the feed system 12 described in reference to FIG. 1. A grizzly 131 is disposed above a vibrating screen 132 to remove oversize materials. Materials which fail to pass through the selected grids of the vibrating screen 132 are discharged into a comminution apparatus, such as a hammermill 133. Soil which passes through the screen 132 falls into a feed hopper 134 disposed directly below the screen 132.

A main feed conveyor 135 extends the entire length below the feed hopper 132 from the hammermill 133 to the intake end 115 of the drum drier 112. A short feeder conveyor 136 extends below the hammermill between a forward discharge end 137 and a rear discharge end 138. The feeder conveyor is operable in either direction to discharge toward the forward or rear ends 137 or 138. When operated toward the forward discharge end 137, materials having passed through the hammermill 133 are deposited on the main feed conveyor and are advanced to be fed into the drum 114. The feeder conveyor 136 consequently is a first provision for loading materials onto the main feed conveyor 135 to charge materials into the drum drier 112. A hopper conveyor 140 is a second provision for loading materials onto the main feed conveyor 135.

As described with respect to the feed system 12 of FIG. 1, the amount of soil passing through the comminution apparatus, such as the hammermill 133 is variable and cannot be accurately estimated beforehand. It is, however, important to control the rate at which the material is introduced into the drum drier 112. Consequently, a weigh cell 142 is placed into the main feed conveyor 135 to determine at any given moment the feed rate of material into the drum drier 112. The feed rate of the hopper conveyor 140 is coupled to the weigh cell 142 in a control box 145 of the apparatus 100. The control box may include may respond to moisture contents and other decontamination parameters to establish an optimum feed rate for the main feed conveyor 135. In the alternative, an operator may pre-establish an optimum feed rate for observed soil conditions of soil before it is loaded onto the feed system 110. If an increased amount of soil passes through the hammermill 133 and is loaded onto the main feeder conveyor 135, such increase in output from the hammermill is measured by the weigh cell 142 and the hopper feed conveyor 140 is correspondingly slowed down to compensate for the increased output from the hammermill. A lag in response because of the downstream location of the weigh cell 142 may require a damping or averaging circuit in responding to variations in the feed rate of the main feed conveyor 135. A problem of feeding wet and clay type soil constituents from the feed hopper may be experienced because of materials sticking together and clogging the operation of the feed hopper conveyor 140. These problems may be alleviated by the operation of spiked rotating shafts 146 which are disposed at the front discharge end of the feed hopper 134. A plate (not shown) may be placed against the inward facing extremes of the stacked shafts 146 when extremely dry soil of primarily granular consistency is being treated by the apparatus 100. Also, a control gate 147 may be placed above the main feed conveyor 135 adjacent and ahead of the weigh cell 142 to control and even the flow of material across the weigh cell and into the drum drier 112.

Figure 3:
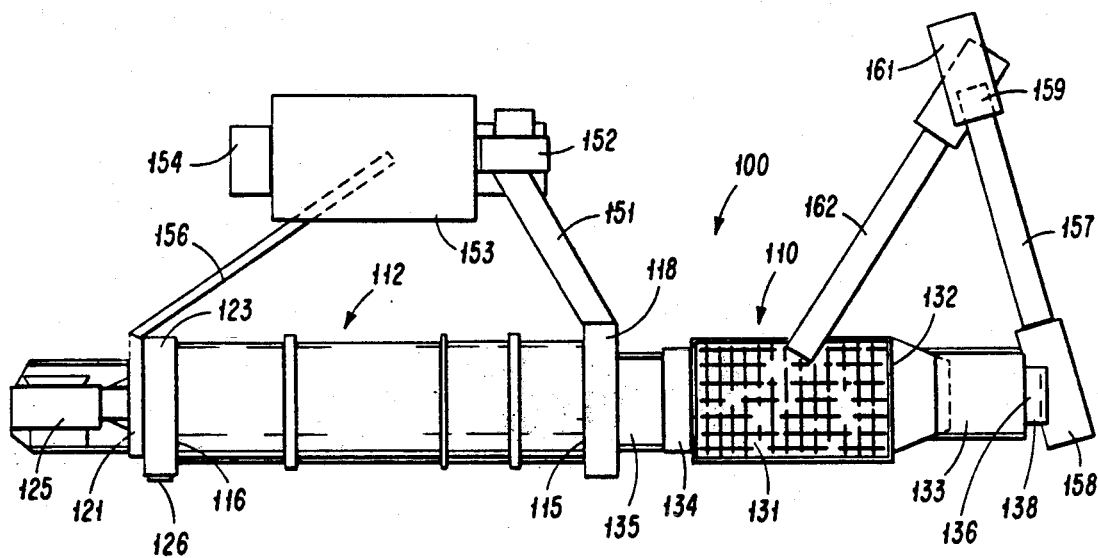
FIG. 3 is a schematic plan view showing a particular operational setup of the apparatus in FIG. 2 in conjunction with a ferrous material removal loop and with a baghouse filter station.

A particular setup of the apparatus 100 in which the exhaust box 118 is connected to a final filter is shown in FIG. 3. In particular, the exhaust box 118 is coupled through a duct 151 to a turbo blower 152 which pushes the exhaust gases into a baghouse filter 153. After passing through the baghouse filter 153 the gases may be exhausted into the environment via exhaust stack 154. Fines removed from the gases in the baghouse filter 154 are ducted through a conduit 156 into the discharge box 123 of the drum drier 112. FIG. 2 further shows a conveyor 157 having a charging hopper disposed below the rear end 138 of the conveyor 136. An upper end 159 of the conveyor 157 conveniently includes a ferrous material separator 161. A return conveyor is disposed to direct the crushed materials back onto the screen 132, from where the materials enter ultimately the feed hopper 134. Thus, when the crusher conveyor 136 is operated to discharge crushed materials onto the conveyor 157 to be returned by the conveyor 162 directly to the feed system 110, there remains only a single load provision for charging the main feed conveyor 135. As a result, the control of the feed rate of the main feed conveyor 135 becomes more accurate and more readily executable.

Figure 4:
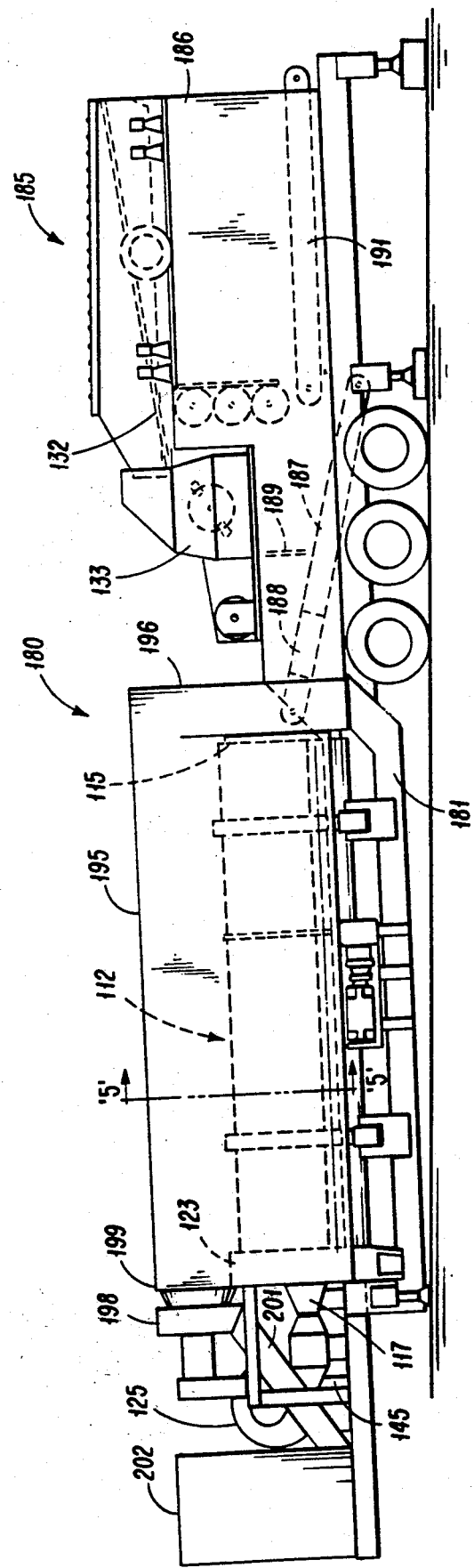
FIG. 4 is a side elevation of an alternate embodiment of a portable soil decontamination apparatus showing a baghouse filter station integrated with the apparatus.

FIG. 4 is a side elevation of a soil decontamination apparatus designated generally by the numeral 180, which is an alternate embodiment of the invention. The soil decontamination apparatus 180 shows particular features which enhances the compactness and portability of the apparatus and, hence, has cost advantages in performing the decontamination operation in remote areas. As is the apparatus 100, the apparatus 180 is mounted on a single frame 181 which allows the apparatus to be transported as a semi-trailer. A soil feed system 185 is somewhat modified with respect to the feed system 110. In particular, the comminution apparatus or, as preferred, the hammermill 133 is mounted ahead of a feed hopper 186 of the feed system 185. As in the described feed system 110, the discharge of oversized soil particles from the screen 132 is directly guided into the hammermill 133. Crushed materials from the hammermill 133 are, however, discharged directly onto a main feed conveyor 187 which also includes a weigh cell or weigh bridge 188. A control gate 189 disposed in the direction of travel of the the main feed conveyor 187 may be incrementally adjusted to control and smoothen the feed rate of material into the respective drum drier 112. The main feed conveyor 187 may be operated at a preset constant speed, the weigh cell 188 measuring the feed rate of the conveyor 187 on a real time basis. In such a mode the feed rate of a feed hopper conveyor 191 may be varied in response to a variation from a predetermined material feed rate of the main feed conveyor 187 as determined by the weigh cell 188. In another mode of operation, the speed of the main feed conveyor 187 may be varied to compensate instantaneously to variations in the feed rate determined by the weigh cell 188. In this latter mode the speed of the feed hopper conveyor 191 may also be varied in response to control signals from the control box 145 of the apparatus 180. In either of the two above modes of operation the control gate may not be needed to smoothen the amounts of material on the main feed conveyor 187. A third mode of operation contemplates the use of the control gate 189 to control the material flow rate on the main feed conveyor 187. In such a mode and with the control gate set at a predetermined height above the conveyor 187, the speed of the conveyor may be varied to directly control the feed rate of the conveyor into the drum drier 112. In this latter mode it is contemplated to operate the feed hopper conveyor 191 in a stop and go mode. In such a mode the primary feed onto the conveyor occurs from feed through the crusher 133. When a decrease in the desired feed rate is detected of less than the preset minimum feed rate and the speed of the main feed conveyor can no longer be increased to increase the feed rate of the conveyor 187, at that time the conveyor 191 is activated and feeds material onto the main feed conveyor until the main feed conveyor again is in control of the feed rate into the drum drier 112.

The apparatus 180 in FIG. 4 also shows a baghouse filter 195 which straddles the drum drier 112. Hot gases are directly discharged at the material intake end 115 of the drum drier 112 into an exhaust header section 196 of the filter 195. Screw conveyors 197 disposed coaxially with the drum drier 112 on both sides thereof are coupled into the discharge box 123 of the drum drier 112 to discharge the collected fines directly into the discharge box to combine with the decontaminated base material of the soil. An exhaust fan 198 is coupled to an exhaust manifold 199 of the filter 195 and draws the exhaust from the drum drier 112 through the filter. An exhaust duct 201 coupled to the turbo output from the fan 198 may be coupled to an afterburner 202 mounted directly onto the frame 181. Exhaust may then be released after a final treatment in the afterburner 202.

Figure 5:
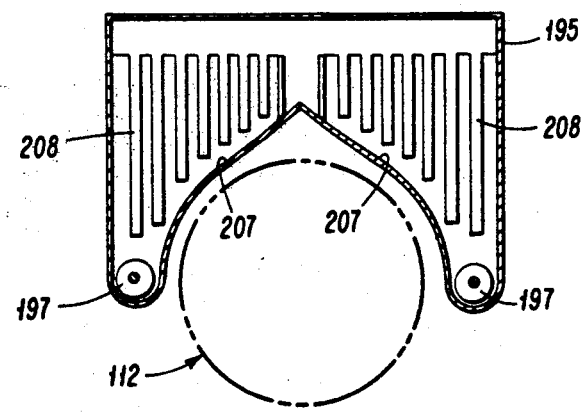
FIG. 5 is a sectional view of the baghouse filter arrangement of the apparatus shown in FIG. 4, taken in the direction "5—5" as indicated in FIG. 4.

FIG. 5 shows the baghouse filter 195 in section, showing particularly an upper exhaust collection chamber 205 which is coupled to the input of the exhaust fan 198. At base extensions 206 on both sides of the drum drier 112, the screw conveyors 197 are disposed within a lowermost trough to collect the filtered dust in an effective manner for direct transfer to the base material at the discharge box 123 as heretofore described. Sloped walls 207 of the inner surface of the filter house 195 guide the collected fines from the filter bags like funnels toward the screw conveyors 197.

Various changes and modifications in the structure of the described embodiment are possible without departing from the spirit and scope of the invention as defined by the terms of the claims appended hereto and reasonable equivalents thereof.

What is claimed is:

1. Apparatus for decontaminating soil comprising:
   a drum drier including a heating and drying zone and a material combination zone;
   means for heating soil, the soil including a base material and soil particles capable of becoming entrained in a gaseous flow, in a hot decontaminating gas stream to a temperature above the vaporization temperature of contaminants within the soil, the soil heating means comprising means for generating and passing a stream of hot gases through the heating and drying zone;
   means for feeding soil at a predetermined rate into the heating and drying zone;
   means for advancing the soil through the drum drier from heating and drying zone into the material combination zone out of exposure to said gas stream;
   means for removing soil particles carried by said gas stream from said gas stream; and
   means for combining such soil particles after removal from said gas stream within the material combination zone with the base material subsequent to the base material having been advanced to the material combination zone out of exposure to said gas stream and with substantially no gaseous movement.

2. Apparatus for decontaminating soil according to claim 1, wherein the soil feeding means comprises:
   means for separating soil into at least two gradations according to particle size;
   a crusher for comminuting soil;
   means for feeding a first gradation of soil through said crusher thereby comminuting the soil;
   a main feed conveyor means for feeding soil to the heating means, the main feed conveyor means including a main feed conveyor and means for determining the feed rate of material being fed to the heating means by the main feed conveyor;
   means for loading the soil comminuted by the operation of said crusher onto the main feed conveyor;
   means for temporarily storing a second gradation of the at least two gradations of soil;
   means for determining the feed rate of soil to the heating means as a result of the operation of the loading means loading comminuted soil onto the main feed conveyor; and
   means for selectively loading soil from the temporary storing means onto the main feed conveyor to supplement soil loaded by the operation of the loading means for loading comminuted soil onto the main feed conveyor to feed soil at a predetermined rate to the heating means.

3. Apparatus for decontaminating soil according to claim 1, the drum drier further comprising at least one zone for reconstituting the soil, the soil reconstituting zone being disposed adjacent the material combination zone, isolated from gaseous flow for decontaminating soil, means disposed between the material combination zone and the soil reconstituting zone for restricting gaseous flow in a direction opposite to the direction of advance of material through the drum in response to the operation of the advancing means, and means communicating with said at least one soil reconstitution zone for reconstituting soil with water.

4. Apparatus for decontaminating soil according to claim 3, wherein said means for heating soil comprises a burner head disposed at one end of said heating and drying zone and means for generating hot gases at the burner head and for directing the hot gases to flow through the heating and drying zone against the general flow of soil through the drum drier, said means for advancing soil through the drum drier out of the exposure to said gas stream comprising flighting for advancing material from the heating and drying zone past the burner head through the material combination zone and into and through such soil reconstituting zone.

5. A method of decontaminating soil comprising:
   feeding soil to be decontaminated at a constant rate into a heating and drying zone of a drum drier;
   advancing the soil through the heating and drying zone of the drum drier;
   generating a stream of hot gases and flowing the stream of hot gases through the heating and drying zone at a rate to heat the soil advancing through the heating and drying zone above a vaporization temperature of contaminants within the soil, the stream of hot gases entraining at least a portion of the soil;

exhausting the stream of hot gases including the entrained portion of the soil from the drum drier;

advancing the portion of the soil remaining within the heating and drying zone of the drum drier from the heating and drying zone to a zone with substantially no gaseous movement;

separating the entrained soil from the hot gases; and recombining the soil separated from the hot gases with the remaining soil within the zone with substantially no gaseous movement.

6. A method according to claim 5, further comprising reconstituting the recombined soil with water in a further zone substantially isolated from the heating and drying zone and the zone with substantially no gaseous movement.

7. A method according to claim 6, further comprising: removing gases including steam generated during the step of reconstituting the recombined soil, mixing the removed gases and steam with gases from the stream of hot gases and passing the mixed gases including the removed gases through a filter.

8. A method according to claim 6, further comprising, after separating the entrained soil from the hot gases, advancing the hot gases into communication with an afterburner for substantially burning residual hydrocarbons in the hot gases, removing gases including steam generated during the step of reconstituting the recombined soil, and combining the removed gases and steam with exhaust gases from the afterburner thereby cooling the exhaust gases.

9. A method according to claim 8, further comprising routing the combined removed gases, steam and exhaust gases from the afterburner through a final filter before releasing such combined gases into the atmosphere.

10. Apparatus for decontaminating soil comprising:

a drum drier including an axially rotatable drum having a material feed end and a material discharge end opposite the material feed end, a decontamination zone within the drum adjacent the feed end of the drum, a combination zone adjacent the decontamination zone, means for advancing materials longitudinally from the material feed end through the decontamination zone and through the combination zone toward the material discharge end of the drum, and a burner disposed axially with respect to said drum for generating a hot gas stream within the decontamination zone of the rotatable drum to flow through the decontamination zone toward the feed end of the drum in a counterflow direction to the material advance through the drum;

means for removing the stream of hot gases at the feed end of the drum;

means for feeding soil at a predetermined rate into the material feed end of the drum and into engagement with the material advancing means of the drum, for the soil to advance in the direction of the discharge end against the flow of hot gases in the decontamination zone of the drum;

means for filtering the hot gases removed at the feed end of the drum prior to releasing them to the atmosphere to thereby separate soil entrained within the hot gas stream from such stream prior to releasing the gases into the atmosphere; and means for combining the soil separated from the hot gas stream by the filtering means with the soil advancing through the drum within the combination zone of the drum immediately past the flame region of the burner.

11. Apparatus for decontaminating soil according to claim 10, wherein the means for filtering the hot gases removed at the feed end comprises first and second filter means coupled in series into the path of hot gases, and wherein an afterburner is disposed within the path of the hot gases, the afterburner burning hydrocarbon gases of the hot gas stream to carbon dioxide and water vapor, the apparatus further comprising means for cooling the hot gases after the gases pass through the afterburner and before the gases are filtered by the second filter means.

12. Apparatus for decontaminating soil according to claim 11, further comprising means, including a supply of water, for reconstituting the soil with water.

13. Apparatus for decontaminating soil according to claim 12, wherein the means for cooling the gases comprises fluid ducts coupled to the soil reconstituting means for combining the hot gases with steam generated by the operation of the soil reconstituting means.

14. Apparatus for decontaminating soil according to claim 10, wherein the soil feeding means comprises:

means for separating soil into at least two gradations according to particle size;

a crusher for comminuting a first gradation of soil;

means for feeding a first gradation of soil through said crusher thereby comminuting the soil;

a main feed conveyor means for feeding soil into the feed end of the drum, the main feed conveyor means including a main feed conveyor and means for determining the rate at which the soil is fed into the feed end of the drum;

means for loading the soil comminuted by the operation of the crusher onto the main feed conveyor;

means for temporarily storing a second gradation of the at least two gradations of soil;

means for determining the feed rate of soil into the feed end of the drum as a result of the operation of the loading means loading comminuted soil onto the main feed conveyor; and means for selectively adding soil from the temporary storing means to the main feed conveyor when the feed rate as a result of the operation of the loading means is less than the predetermined feed rate of soil into the feed end of the drum.

15. Apparatus for decontaminating soil according to claim 10, wherein the means for filtering comprises a filter house mounted across the drum drier to straddle the drum drier, the filter house comprising a header section coupled to the feed end of the drum of the drum drier to receive the hot gases from the drum drier, and means for advancing the separated soil toward and into the combination zone of the drum.

* * * * *